March 28, 1967 D. J. HAMMERAND ET AL 3,311,380

LOW FORCE VELOCITY TRIP

Filed Dec. 16, 1964 2 Sheets-Sheet 1

Inventors
Donald J. Hammerand
Allen J. Bury
BY Nicholas A. Camasto
Atty.

Inventor
Donald J. Hammerand
Allen. J. Bury
BY Nicholas A. Camasto
Atty.

United States Patent Office 3,311,380
Patented Mar. 28, 1967

3,311,380
LOW FORCE VELOCITY TRIP
Donald J. Hammerand, Franklin Park, and Allen J. Bury, Prospect Heights, Ill., assignors to Admiral Corporation, Chicago, Ill., a corporation of Delaware
Filed Dec. 16, 1964, Ser. No. 418,679
5 Claims. (Cl. 274—15)

This invention relates to improvements in automatic phonographs, particularly to improvements in the velocity trip mechanism used to initiate a record changing cycle.

The type of phonograph to which this improvement pertains is the common automatic phonograph being mass produced today, such as that described in the Vistain Patent 2,983,515 granted May 9, 1961. The basic components are a pan, on which a motor engageable with a turntable is mounted, a disk-type record supported by the turntable, and a pivotable tone arm containing a pick-up cartridge and stylus for engagement with a spiral groove in the record.

Some of the major problems in the recording industry have been rapid record wear and deterioration in high frequency reproduction, both partially due to the combination of a relatively heavy stylus force, or stylus weight on the record, and fabrication of records from a soft material such as vinyl plastic. Major factors in alleviating these problems were the development of low stylus force tone arms and more sensitive cartridges. However, the relatively narrow and shallow groove long playing record development created still another problem, namely that of the low force stylus jumping the record groove. The basic causes of the stylus jumping the record groove are the combination of low stylus force and the mechanisms attached to the pivotable tone arm which must be moved by the stylus tracking in the record groove. One of such tone arm driven mechanisms is a means for initiating the record changing cycle, a commonly used means being a velocity trip mechanism. This mechanism, such as described in the above mentioned Vistain patent, depends upon an exaggerated movement of the tone arm towards the center of the record at a particular time. Exaggerated tone arm movement is caused by the stylus tracking in a widely spaced groove, called a run-out groove, at the end of the record.

The velocity trip mechanism heretofore mentioned, due to the many moving parts, requires a relatively large tone arm force greatly impairing proper operation of the automatic phonograph when operating in the low stylus force region of two grams or less. Accordingly, it is an object of this invention to provide a simple, economical and trouble-free velocity trip mechanism suitable for incorporation in an automatic phonograph utilizing a low stylus force.

A further object of this invention is to provide low force velocity trip means for initiating a record changing cycle in an automatic phonograph.

Another object of this invention is to provide simple an novel means for initiating a record changing cycle which eliminates all moving links and members that resist rotation of the tone arm.

A still further object of this invention is to provide electromechanical record changing cycle initiation means in an automatic phonograph.

A feature of this invention resides in the use of a very sensitive gravity-friction clutch, one member of which comprises a resettable electrical contact for controlling energization of an electromagnet and consequent initiation of record changing cycles in an automatic phonograph.

The primary advantage of this invention is the elimination of low force styli jumping narrow and shallow record grooves thus repeating the same groove twice. Coexistent with the primary advantage is a decrease in the high rate of record wear and a substantial elimination of loss of high frequency reproduction heretofore caused by heavy stylus force.

Other objects and advantages of this invention will become apparent on an examination of the following description taken in conjunction with the accompanying drawings where:

Figure 1:
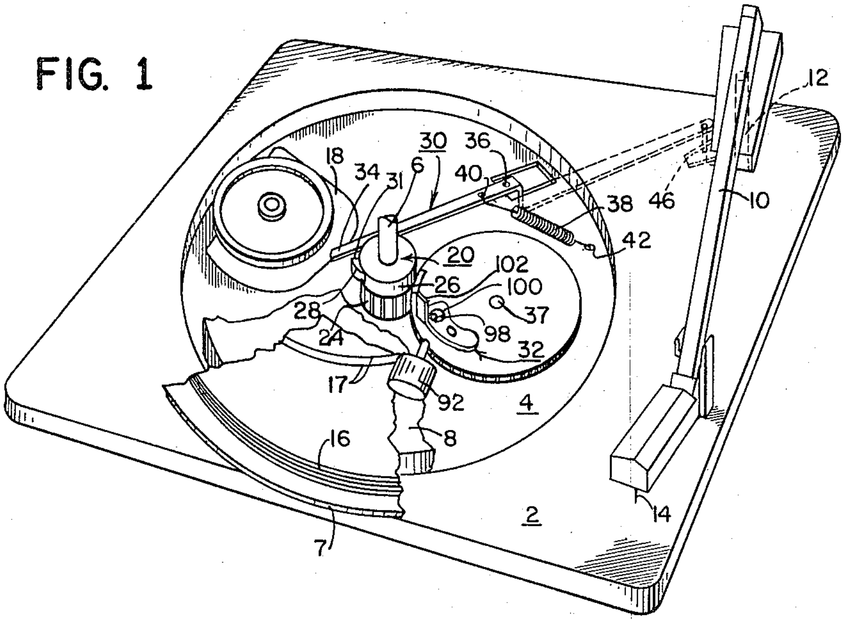
FIG. 1 is a perspective view of an automatic record changer in which the invention is incorporated.

The record player, as will be particularly noted in FIG. 1, comprises a pan 2, the center of which contains a depressed circular portion 4 through which is mounted a spindle 6 for centering a record 7 to be played. Pan 2 supports a turntable 8 rotatably mounted about spindle 6, the turntable supporting the record 7. Tone arm 10 is mounted for radial and axial movement on hollow tone arm shaft 12 which in turn is supported by pan 2 through suitable means (not shown). Extending downwardly near the free end of tone arm 10 is a pickup stylus 14 engageable with continuous but variably spaced spiral groove areas 16 and 17 of record 7 (more clearly shown in FIG. 5). A driving motor 18, suitably mounted on pan 2, is drivingly engageable with turntable 8 which rotates and imparts motion to record 7. As pickup stylus 14 tracks in the record groove areas 16 or 17, the tone arm is driven towards the center of the record. The tone arm moves substantially at one predetermined speed towards the center of the record while tracking the recording groove area 16 and at a second predetermined speed while tracking the more widely spaced runout groove area 17.

Figure 2:
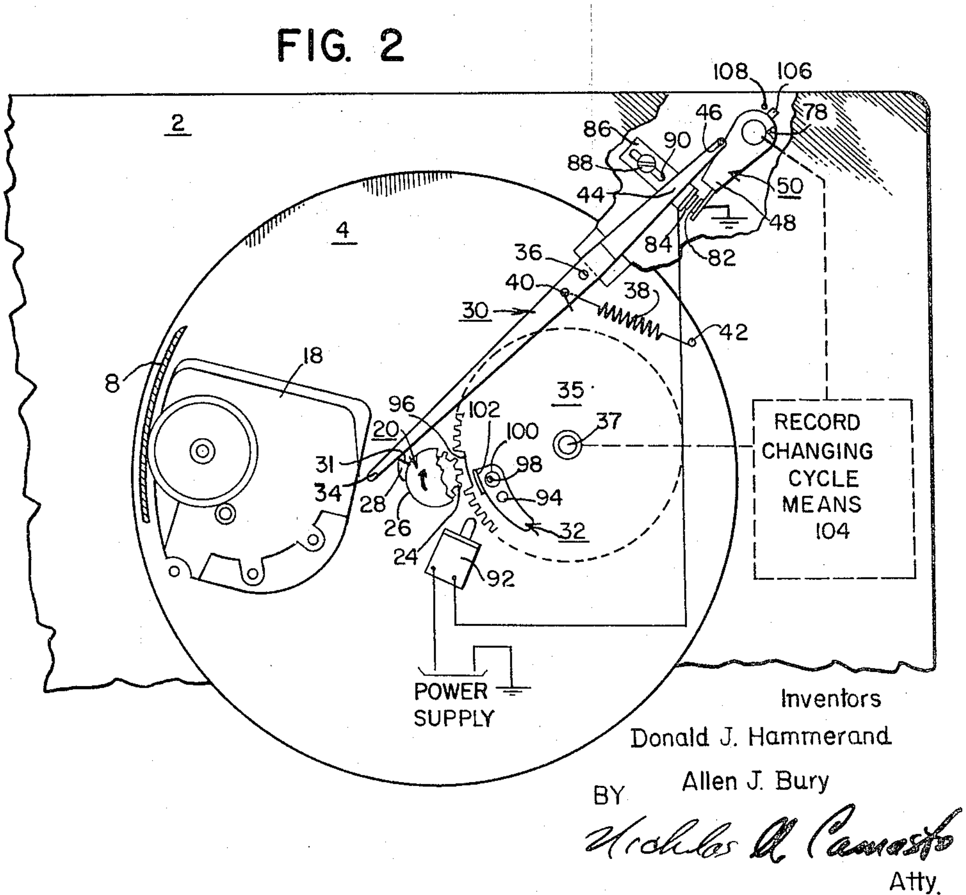
FIG. 2 is a top view of a changer showing schematically the essential parts of the velocity trip mechanism excluding clutch details.

A hub 20 (FIG. 1), permanently affixed to the underside of turntable 8, consists of an upper portion and a geared lower portion. The hub upper portion comprises a smooth circular surface 26 from which portrudes a cam 28 having a flat striking surface 31. Cam 28 engages a lever arm 30 once per turntable revolution (FIG. 2), and at an appropriate time in the sequence of operation, flat striking surface 31 engages a gear engagement pawl mechanism 32. The geared lower portion 24 of hub 20 is adapted to engage a mutilated gear 35, rotatably mounted on depressed circular portion 4 at 37, in a manner to be explained in detail hereinafter.

Lever arm 30 is pivotally mounted by suitable means to pan 2 at a point 36 substantially two-thirds its length as measured from end 34. A lightly tensed spring 38 coupled between a small aperture 40 in lever arm 30 and a small aperture 42 in pan 2 insures continual sliding contact between the hub upper portion and lever arm end 34. Upon rotation of turntable hub 20 by driving motor 18, cam 28 imports a partial rotational movement to lever arm 30. Secured to clutch end 44 of lever arm 30 is a substantially downwardly extending stud 46 of sufficient length to be engageable with arm 48 of switch disk 50.

Figures 3, 4, 5, 6:
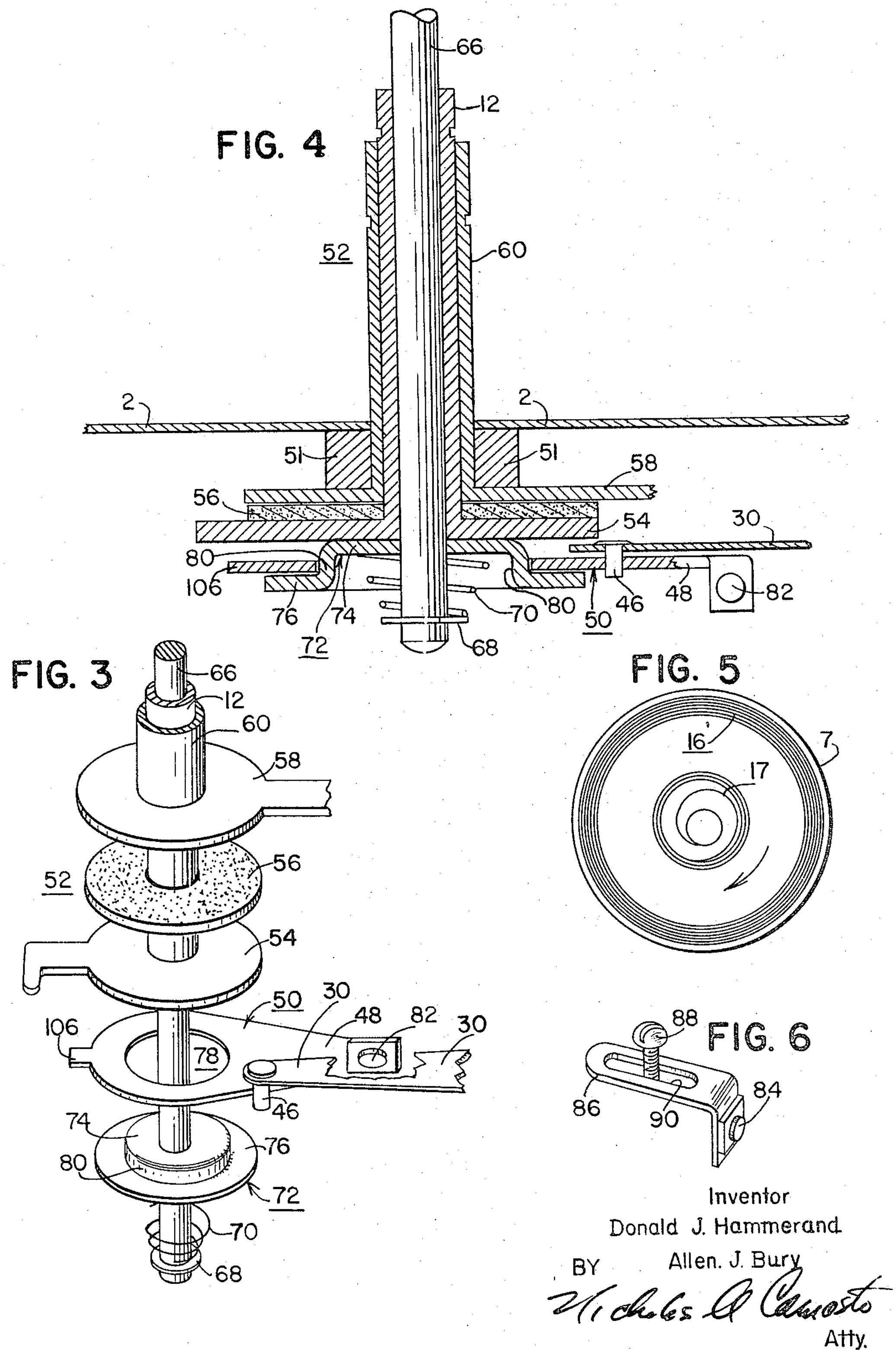
FIG. 3 is an exploded perspective view of the gravity-friction clutch with the elements displaced in the vertical direction from each other for the sake of clarity.
FIG. 4 is a sectional view of the clutch indicating the inter-action of the clutch elements.
FIG. 5 is a top view of a typical record showing the recording groove area and the run-out groove area.
FIG. 6 is a perspective view of the stationary electrical contact.

Slightly beyond and below the perpendicular stud 46, is an assembly generally designated 52 shown in detail in FIGS. 3 and 4. Assembly 52, separated from pan 2 by a circular spacing block 51, consists of two clutches, a tone arm clutch and a switch disk clutch. The tone arm clutch provides a coupling for tone arm 10 and a set down index washer 58 to maintain proper tone arm set down for various diameter records. The set down mechanism is well known in the art as shown, for example, in the above mentioned Vistain patent.

The tone arm clutch consists of hollow tone arm shaft 12, a flat metal tone arm washer 54, a cork washer 56, a set down index shaft 60, and the set down index washer 58. Tone arm washer 54 is permanently affixed to the lower end of tone arm shaft 12, and set down index washer 58 is permanently affixed to the lower end of set down index shaft 60 in any suitable manner such as by peening. At specific times in the record changing cycle, which times are not pertinent to this invention, cork washer 56 provides a frictional bond between washers 54 and 58.

Directly below the tone arm clutch is the low friction switch disk clutch. This clutch comprises an offset circular metal stamping 72 pivotally engageable with push-up rod 66 used for pivoting tone arm 10 about its horizontal axis, and switch disk 50. The offset metal stamping 72 is held in place by spiral compression spring 70 urging the top surface of upper portion washer 74 against the lower surface of tone arm washer 54. The coefficient of friction between the top surface of upper portion washer 74 of the offset stamping and the lower surface of tone arm washer 54, along with the force of the compression spring, insures sufficient limiting friction to couple the stamping to the tone arm. Hence, any pivotal movement of the tone arm caused by the stylus tracking in the record groove is translated to the offset metal stamping.

Offset metal stamping 72 also has a lower portion washer 76 parallel to upper portion washer 74. Switch disk 50, being substantially circular with a tapered contact arm 48, a protruding stop 106, and an aperture 78 of a diameter slightly larger than that of shoulder 80 of the offset metal stamping, rests on the lower portion washer 76. The only pressure exerted between switch disk 50 and the upper surface of lower portion washer 76 is that caused by gravity acting on the switch disk. When the phonograph is in normal playing operation, switch disk 50 rotates clockwise in the same manner as lower portion washer 76 on which it rests, since there is no resistive force tending to rotate it counterclockwise.

A relatively low coefficient of friction is provided between switch disk 50 and the upper surface of lower portion washer 76 and in conjunction with the low height of switch disk 50 a very small force is all that is necessary to rotate member 50 relative to offset metal stamping 72. These conditions allow switch disk 50 to be rotated counterclockwise for resetting, the purpose to be explained hereinafter, while the tone arm motion remains virtually unaffected. The force urging switch disk switch 50 counterclockwise is in the form of a periodic tap exerted by stud 46 and lever arm 30, which as described previously are moved by cam 28 once per revolution of hub 20.

Perpendicularly affixed to contact arm 48, and substantially at the end thereof is an electrical contact 82. Facingly opposed to this contact and at a predetermined distance therefrom, is an insulated fixed contact 84 adjustably mounted under pan 2 by means of fixed contact support 86. Adjustment is provided by loosening a nut and bolt 88 and sliding the fixed contact support within an elongated aperture 90. As previously explained, stylus 14, in tracking recording groove areas 16 and 17, imparts a radial movement to tone arm 10 which pivots switch disk 50 and electrical contact 82 connected thereto, towards fixed contact 84. Engagement of these two contacts while the stylus is in the recording groove area would initiate an untimely record changing cycle, i.e. before the record is completed. Consequently, reset means are provided which consist of the intermittently tapping lever arm 30, stud 46, and switch disk 50, the member which is reset. As switch disk 50 and contact 82 move slowly in the direction of fixed contact 84, lever arm 30 resets switch disk 50 once each turntable revolution by tapping switch disk 50 in the opposite direction. Movement of the tone arm continually tries to close contacts 82 and 84, and lever arm 30 periodically resets the former contact so long as the rate of tone arm radial movement per turntable revolution is less than a predetermined amount. This occurs when the stylus is tracking in recording groove area 16.

When the stylus tracks the wider spaced groove run-out area 17, the radial movement of tone arm 10 and switch disk 50 are exaggerated. Under the influence of this exaggerated movement, contact 82 engages contact 84 before lever arm 30 can reset the switch disk thus allowing energization of an electromagnet 92. The length of the contact arm 48 and the length and pivot point of the lever arm are such that switch disk 50 need be moved only slightly to reset the gap, thereby insuring that a minimum amount of force is translated to the tone arm. A stop tab 106 substantially opposite tapered contact arm 48 cooperates with a stud 108 mounted on pan 2 to prevent undue counterclockwise rotation of switch disk 50 during the record changing cycle.

The electromagnet 92 is fixedly secured to depressed circular portion 4 in close proximity to the gear engagement pawl 32 which is fabricated of magnetically permeable material. Gear engagement pawl 32 is mounted for limited pivotal movement at 94 on the mutilated gear 35 at a point adjacent a break 96 in the continuity of the teeth of the gear. Pivotal movement of the gear engagement pawl 32 is limited by a pin or stop 98 on the mutilated gear 35 which extends through a hole 100 in the pawl 32. The pawl carries an upward turned lug 102 which, when the pawl is moved clockwise, is out of the course of striking surface 31 carried by turntable hub 20. When the pawl is moved counterclockwise by the magnetic attraction of the energized electromagnet the lug is in the course of striking surface 31. When in the latter position and consequently engaged by striking surface 31, just enough rotary motion is imparted to the mutilated gear 35 to cause meshing engagement between the teeth thereof and geared portion 24 of hub 20, thereby initiating the record changing cycle via record changing cycle means 104—well known in the art.

In the invention herein described, the force transmitted between stylus and recording grooves due to the velocity trip mechanism has been virtually eliminated. The relatively small area and light weight of the switch insures a minimum inertia force component, and the low coefficient of friction and lack of sliding links and members insures a minimum frictional force. As the force necessary to pivot tone arm 10 is decreased, the vertical stylus force required to hold stylus 14 in a record groove, such as in area 16 or 17, is decreased. Low stylus force is consistent with long record life, and continued high quality reproductions, especially in view of the softer record material used in manufacturing.

Many modifications and alterations of the invention, far different both in appearance and details of construction from the embodiment herein illustrated but nevertheless utilizing the basic teachings of the invention, will be readily apparent or devised upon study by persons skilled in the art. Accordingly, the scope of the protection to be afforded should not be limited by the particular embodiment illustrated and described, but should be determined from the descriptions of the essence of the invention which appear in the appended claims.

The embodiments of the invention in which an exclusive property or privilege is claimed are defined as follows:

1. A velocity trip mechanism for initiating a record changing cycle in an automatic record playing apparatus comprising: a movable tone arm; a switch including a first and a second contact; gravity-friction clutch means interposed between said tone arm and said first contact; a rotating turntable including camming means; a pivotally mounted lever arm having a first end cooperating with said camming means and a second end cooperating with said first contact; said second end being normally disengaged from said first contact, but periodically engageable therewith for positively urging it away from said second contact; an electromagnet serially connected with said switch; magnetically permeable pawl means movably responsive to energization of said electromagnet, whereby an exaggerated tone arm movement moves said first contact into engagement with said second contact before said lever arm urges said first contact away therefrom, thereby energizing said electromagnet; and means responsive to movement of said pawl means for carrying out a record changing cycle.

2. A low force velocity trip mechanism for initiating a record changing cycle in an automatic record playing apparatus comprising: a base, a radially movable tone arm mounted on said base; a switch comprising a movable contact having a low moment of inertia, and a stationary contact; means exhibiting a very low coefficient of friction coupling said movable contact to said tone arm for movement therewith toward said stationary contact; a rotating turntable including camming means; a pivotally mounted lever arm having a spring urging one of its ends against the periphery of said camming means, the remaining end of said lever arm being periodically engageable with said movable contact for resetting it by tapping it away from said stationary contact; an electromagnet in series with said switch; a magnetically permeable gear engagement pawl attracted by said electromagnet upon energization thereof; whereby an exaggerated radial tone arm movement moves said movable contact toward said stationary contact, closing said switch before being reset, said switch allowing energization of said electromagnet; and means for carrying out a record changing cycle responsive to movement of said gear engagement pawl.

3. A low force velocity trip mechanism for initiating a record changing cycle in an automatic record playing apparatus comprising: a radially movable tone arm; support means coupled to an movable with said tone arm; a switch disc supported by and frictionally coupled to said support means, for movement relative thereto; said support means and said switch disc having a low moment of inertia and a small coefficient of friction therebetween for unhindered radial movement of said tone arm during operation and when said switch disc is moved relative to said support means, respectively; a switch comprising a movable contact mounted on said switch disc, and a stationary contact; an electromagnet in series with said switch; a magnetically permeable gear engagement pawl attracted to said electromagnet upon energization thereof; a rotating turntable including camming means; a pivotally mounted lever arm having a spring urging one of its ends against the periphery of said camming means, the other end of said lever arm periodically engaging said switch disc for moving it relative to said support means, thereby moving said movable contact away from said stationary contact, whereby an exaggerated radial movement of said tone arm moves said movable contact toward said stationary contact and closes said switch before the lever arm engages the switch disc thus allowing energization of said electromagnet; and means for carrying out a record changing cycle responsive to movement of said pawl.

4. A low force velocity trip mechanism for initiating a record changing cycle in an automatic phonograph comprising: a base; a turntable including a geared hub, rotatably mounted on said base; a prerecorded disk including a spiral groove track supported by said turntable; a radially movable tone arm mounted on said base; a low force stylus mounted in said radially movable tone arm for co-operation with said recording grooves; a gravity-friction clutch, including a low inertia switch disk, coupled to said tone arm; a switch including a first contact mounted on said low inertia switch disk and a second contact; the normal movement of said stylus co-operating with said spiral groove track driving said first contact towards said second contact; a cam including a striking surface mounted on said geared hub; a lever arm pivotally mounted on said base including a clutch end and a cam end; a substantially perpendicular stud secured to said lever arm at said clutch end; a spring maintaining the cam end of said lever arm in contact with said cam for imparting periodic motion to said lever arm responsive to rotation of said turntable and said geared hub; said stud engageable with said low inertia switch disk for cancelling the radial movement of said first contact towards said second contact when the radial movement of said tone arm is less than a predetermined amount per revolution of said turntable; an electromagnet mounted on said base and energizable responsive to closure of said switch; a mutiliated gear mounted on said base adjacent to said geared hub, said mutilated gear including a magnetic gear engagement pawl mounted for limited movement at its outer circumference; said magnetic gear engagement pawl movable beyond said outer circumference and into the path of said striking surface for imparting initial rotational motion to said mutilated gear; said first contact pivoting into engagement with said second contact and closing said switch before said cam engages said cam end of said lever arm, responsive to a radial tone arm movement greater than said predetermined amount per revolution of said turntable; said electromagnet upon energization moving said magnetic gear engagement pawl into the path of said flat striking surface, whereby said mutilated gear is carried into driven engagement with said geared hub and means responsive to rotation of said mutilated gear for carrying out a record changing cycle.

5. A velocity trip mechanism for initiating a record changing cycle in automatic record playing apparatus comprising: a radially movable tone arm; clutch means consisting of a tone arm clutch for maintaining proper tone arm set-down for various diameter records, and a switch disk clutch; said switch disk clutch including supporting means frictionally coupled to said radially movable tone arm and a switch disk supported by and rotatable relative to said supporting means, said supporting means and said radially movable tone arm frictionally coupled by a limiting friction of a value greater than a limiting friction coupling said supporting means and said switch disk; whereby said radially movable tone arm is unaffected by the movement of said switch disk relative to said supporting means; a switch including a movable contact mounted on said switch disk and a stationary contact; an electromagnet in series with said switch; a gear engagement pawl movable upon energization of said electromagnet; a rotating turntable including camming means; a pivotably mounted lever arm; a spring urging one end of said lever arm against the periphery of said camming means, the opposite end of said lever arm engageable with said switch disk for periodically rotating said switch disk relative to said supporting means, thereby moving said movable contact away from said stationary contact; whereby an exaggerated radial tone arm movement pivots said movable contact toward said stationary contact closing said switch before said lever arm engages said switch disk, said switch allowing energization of said electromagnet; and means for carrying out a record changing cycle responsive to movement of said gear engagement pawl.

References Cited by the Examiner

UNITED STATES PATENTS

| | | | |
|---|---|---|---|
| 2,287,727 | 6/1942 | Cranmer | 274—10 |
| 2,295,460 | 9/1942 | Farrow | 274—1 |
| 2,339,981 | 1/1944 | Cranmer et al. | 274—10 |
| 2,371,361 | 3/1945 | Small | 274—10 |
| 2,457,106 | 12/1948 | Pressley | 274—10 |

NORTON ANSHER, *Primary Examiner.*

JOHN M. HORAN, J. F. PETERS, *Assistant Examiners.*